(12) United States Patent
Stout et al.

(10) Patent No.: US 7,517,155 B2
(45) Date of Patent: Apr. 14, 2009

(54) RESILIENT MOUNT OF UNIFORM STIFFNESS

(75) Inventors: David E. Stout, Tucson, AZ (US); Balwinder S. Birdi, Tucson, AZ (US); Anna C. Gradillas, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 378 days.

(21) Appl. No.: 11/468,665

(22) Filed: Aug. 30, 2006

(65) Prior Publication Data

US 2008/0056633 A1 Mar. 6, 2008

(51) Int. Cl.
*F16C 27/00* (2006.01)

(52) U.S. Cl. .......................... 384/535; 384/99
(58) Field of Classification Search .................. 384/535, 384/536, 581, 582, 99, 215; 267/158, 160, 267/161, 182
See application file for complete search history.

(56) References Cited

U.S. PATENT DOCUMENTS

| | | | | |
|---|---|---|---|---|
| 3,101,979 A | * | 8/1963 | Mard | ........................... 384/99 |
| 3,473,853 A | * | 10/1969 | Arthur et al. | ................ 384/535 |
| 3,704,922 A | | 12/1972 | Kleinschmidt et al. | |
| 4,044,977 A | * | 8/1977 | Feucht | .................... 267/141.3 |
| 4,142,618 A | | 3/1979 | Fontaine et al. | |
| 5,033,875 A | | 7/1991 | Moulinet | |
| 5,044,784 A | | 9/1991 | Lisowsky | |
| 5,062,721 A | * | 11/1991 | Chiba | ......................... 384/536 |
| 6,149,382 A | * | 11/2000 | Englander et al. | ........... 384/536 |
| 6,480,363 B1 | * | 11/2002 | Prater | ......................... 384/536 |
| 6,536,953 B1 | | 3/2003 | Cope et al. | |
| 6,563,243 B2 | | 5/2003 | Obara et al. | |
| 7,052,183 B2 | | 5/2006 | Chen et al. | |
| 2003/0099417 A1 | * | 5/2003 | Bauer et al. | ................. 384/535 |

FOREIGN PATENT DOCUMENTS

| | | |
|---|---|---|
| BE | 444828 A | 4/1942 |
| DE | 7140248 U | 1/1972 |
| FR | 2719094 A | 10/1995 |

OTHER PUBLICATIONS

European Search Report dated Jan. 16, 2009.

* cited by examiner

*Primary Examiner*—Thomas R Hannon
(74) *Attorney, Agent, or Firm*—Oral Caglar, Esq.

(57) ABSTRACT

A centering ring may be used to provide a resilient mounting system with uniform stiffness for rotating machinery. The centering ring may have first and second exterior raised ridges on one surface and a central raised ridge on the other surface. The centering ring may be disposed between the housing of the rotating machinery and a bearing provided therein. Due to its uniform cross-sectional geometry about its entire circumference, the centering ring may provide uniform stiffness in any radial direction. The centering ring may be useful in any rotating machinery, including generators, turbo machines and turbine engines.

10 Claims, 4 Drawing Sheets

RESILIENT MOUNT OF UNIFORM STIFFNESS

BACKGROUND OF THE INVENTION

The present invention generally relates to a resilient mount for a shaft and, more specifically, to a resilient mount having uniform stiffness to achieve and maintain controlled stiffness of the rotor shaft support system.

In the field of rotating machinery, new designs are pushing towards more efficient, higher power, higher speed flexible rotating shaft assemblies to form part of highly competitive products, such as turbine engines, turbo machinery, electric motors and generators. In high speed machinery such as these, potentially large centrifugal forces can be imposed by the rotating components operating at high speeds. These components must be precisely balanced to avoid vibration which may lead to deviation of the shaft axis from its intended axis of rotation. Practically achieving, and maintaining, this precision balance can be difficult due to variations in the manufacture and assembly process, particularly for electric motors and generators.

The amplitudes of vibrations resulting from out of balance can be significant if the rotational speed reaches its resonance speed, or a multiple of its resonant speed. Such speeds are generally referred to as "critical speeds." Critical speeds and machine response is a function of the mass, the shaft, bearings, housing and interface. Typical rotating machines, especially aerospace, employ rolling element bearings which have very high stiffness and provide little damping. If an unbalanced shaft is rotating for prolonged periods of time near one if its critical speeds, it may be damaged, even catastrophically.

U.S. Pat. No. 3,704,922, issued to Kleinschmidt et al., describes an intermediate bearing assembly and its supporting structures for an automotive application. The '922 patent is drawn to a design to secure an automotive drive shaft radially but still allow axial movement with an elastomeric tire. The design of this patent does not migrate the critical speeds of a high speed rotating shaft outside of the operating speed range.

U.S. Pat. No. 5,033,875, issued to Moulinet, describes a vibration reduction system for use in the automotive industry, especially for relatively low speed motor vehicle transmission shafts. The vibration reduction is achieved by using an elastomer ring damper between the bearing outer race and the support structure. This ring damps and reduces the vibration and prevents it from being transmitted to the chassis and passenger cell of the vehicle. This patent, however, is not designed to migrate the critical speeds of a high speed rotating shaft outside the operating speed range. The elastomeric ring disclosed in the '875 patent does not have a uniform cross-section, thus requiring specific manufacture and design considerations.

U.S. Pat. No. 7,052,183, issued to Chen et al., describes a centering ring having a specific geometric cross section. The centering ring only provides for an average stiffness, taking all the different cross sectional areas into account. Moreover, the resonant frequencies and critical speeds are more difficult to predict due to the variable stiffness/geometric cross section of the centering ring. Finally, having a variable geometric cross section, the centering ring of the '183 patent may require specific manufacturing costs and time.

There are existing shaft mounting systems to migrate the critical speeds of the rotating machinery outside the operating speed range. In particular, the use of mechanical springs usually consist of a band of material with a number of equally spaced support bumpers on the ID and OD. Problems with current rotating machinery resilient mount systems include 1) they are difficult to analyze accurately because the stiffness of the spring varies depending on the direction of load application; 2) they are prone to wear and fretting because of the relatively small portions of the centering rings in contact with either the bearing or the housing; 3) they are relatively difficult and expensive to machine due to their design; and 4) they addition of more bumpers to increase the spring stiffness complicates the machining further and increases cost.

As can be seen, there is a need for an improved mounting system for high speed rotating shafts that is easily machined, has a constant stiffness and provides the ability to migrate the rotor critical speeds out of the operating speed range.

SUMMARY OF THE INVENTION

In one aspect of the present invention, a centering ring comprises an inside surface and an outside surface; a first side and a second side, the first side and the second side defining end points along a width of the centering ring; a first exterior raised ridge and a second exterior raised ridge disposed about a circumference on the first side and the second side of the centering ring; and a central raised ridge disposed about a circumference on the centering ring; wherein the first exterior raised ridge and the second exterior raised ridge are both on one of the inside surface or the outside surface and the central raised ridge is on the other of the inside surface or the outside surface.

In another aspect of the present invention, a resilient mounting system comprises a bearing adapted to support a shaft; a housing adapted to support the bearing; a centering disposed between the housing and the bearing, the centering ring comprising: an inside surface adapted to fit about the bearing; an outside surface adapted to fit within the housing; a first side and a second side, the first side and the second side defining end points along a width of the centering ring; a first exterior raised ridge and a second exterior raised ridge disposed about a circumference on the first side and the second side of the centering ring; and a central raised ridge disposed about a circumference on the centering ring; wherein the first exterior raised ridge and the second exterior raised ridge are both on one of the inside surface or the outside surface and the central raised ridge is on the other of the inside surface or the outside surface.

In yet another aspect of the present invention, a rotating machine comprises a shaft; a bearing supporting the shaft; a housing supporting the bearing; a centering disposed between the housing and the bearing, the centering ring comprising: an inside surface disposed about the bearing; an outside surface disposed within the housing; a first side and a second side, the first side and the second side defining end points along a width of the centering ring; a first exterior raised ridge and a second exterior raised ridge disposed about a circumference on the first side and the second side of the centering ring; and a central raised ridge disposed about a circumference on the centering ring; wherein the first exterior raised ridge and the second exterior raised ridge are both on one of the inside surface or the outside surface and the central raised ridge is on the other of the inside surface or the outside surface.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Briefly, the present invention provides a resilient mount having a ring with a constant revolved cross section supported around the entire inside and outside diameters by a bearing and a housing, respectively. This design reduces component wear and functions by enabling axial deflection of the ring as opposed to circumferential deflection as taught by conventional designs. This axial deflection produces a spring-like action by allowing some limited range of movement between the bearing and the housing. In an exemplary embodiment, the resulting spring action exhibits a constant stiffness, regardless of the load application angle, so that the resonant frequencies and critical speeds can be more precisely predicted. The resilient mount of the present invention may be useful in any application where a rotating shaft is supported by a bearing, such as in turbine engines, turbo machines, generators and the like.

Conventional shaft mounting systems may be prone to wear and fretting because of the relatively small surface areas of the centering rings that are actually in contact with either the bearing or the housing. The resilient mounts of the present invention mitigate the onset of wear and fretting by providing a greater surface area of contact with both the bearing and the housing, along the entire circumference of the ring.

Figure 1:
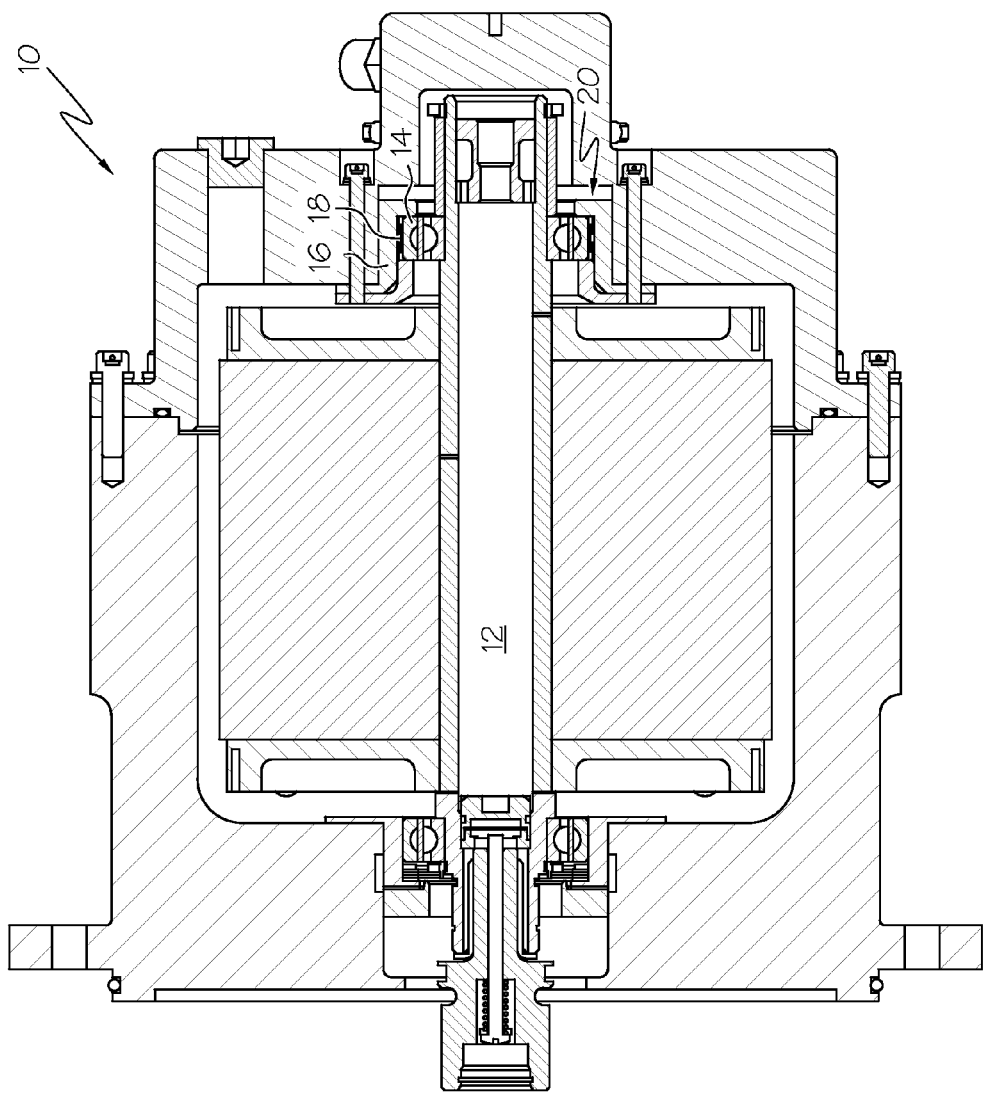
FIG. 1 is a cross-sectional view of a rotating machine having a resilient mount according to the present invention.
Figure 2:
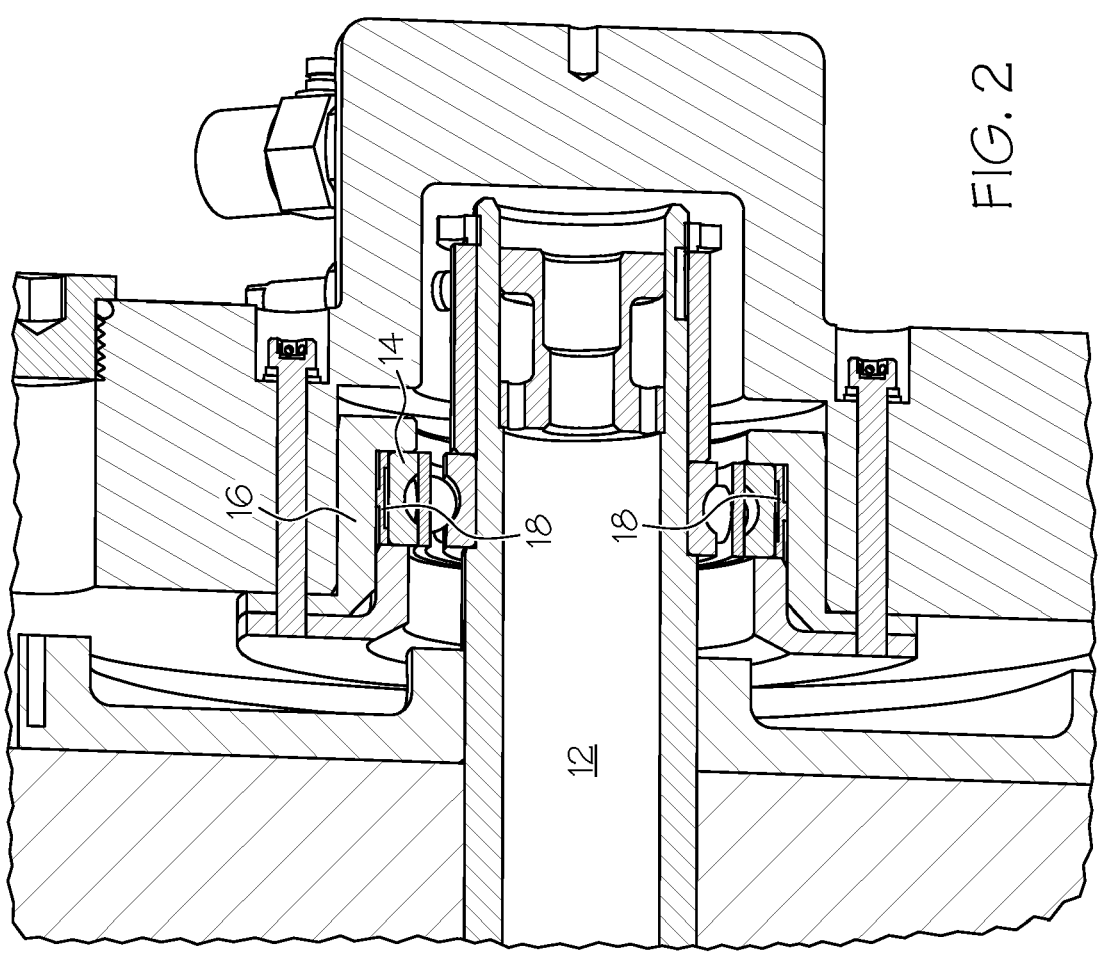
FIG. 2 is a close-up cross-section view of the rotating machine application of FIG. 1.
Figure 3:
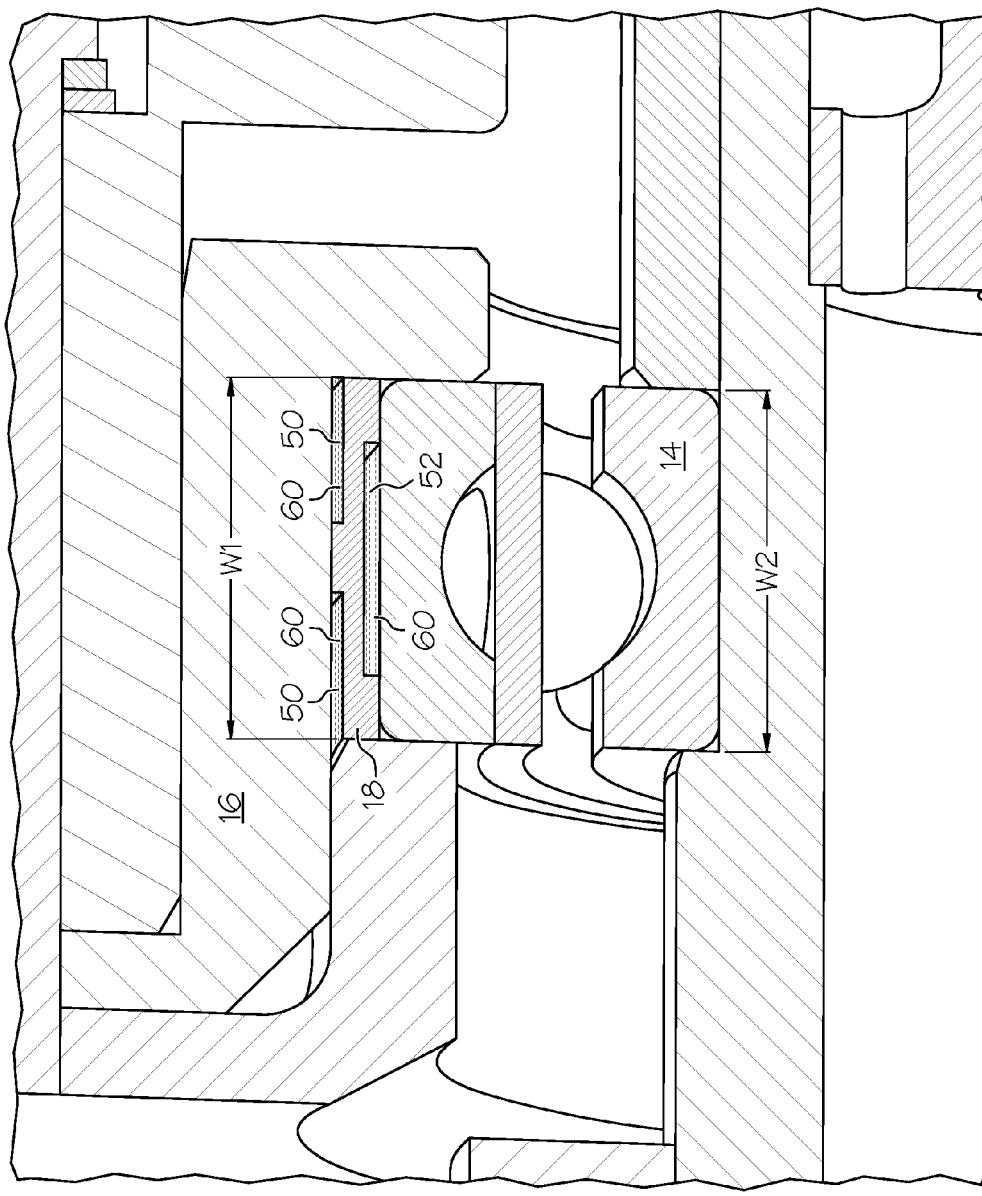
FIG. 3 is a further close-up cross-section view of the rotating machine of FIG. 2, showing the specific geometry of the centering ring.

Referring to FIGS. 1-3, there are shown cross-sectional views of a rotating machine 10 having a resilient mount 20 according to the present invention. Rotating machine 10 may include a shaft 12 mounted in a bearing 14. The bearing may be positioned inside a housing 16. A centering ring 18 may be positioned between the bearing 14 and the housing 16. As shown more clearly in FIG. 3, the centering ring 18 may be sized such that a width, W1, of the centering ring 18 may be approximately the same as a width, W2, of the bearing 14.

Figure 4:
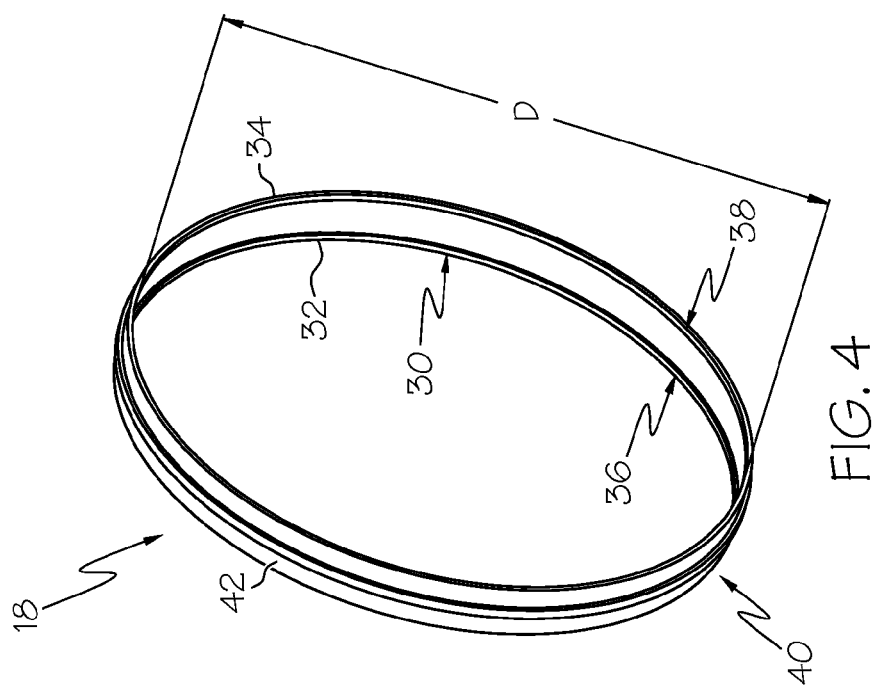
FIG. 4 is a perspective view of the centering ring according to one embodiment of the present invention.

Referring now to FIG. 4, there is shown a perspective view of the centering ring 18 according to one embodiment of the present invention. The centering ring 18 may have an inside surface 30 and an outside surface 40. When the centering ring 18 is installed in the resilient mount 20, the inside surface 30 may be proximate/adjacent the bearing 14 while the outside surface 40 may be proximate/adjacent the housing.

The centering ring 18 may have a first side 32 and a second side 34 defining end points along its width W1. The inside surface 30 of the centering ring 18 may have a first exterior raised ridge 36 and a second exterior raised ridge 38 at the first side 32 and the second side 34, respectively. Exterior raised ridges 36, 38 may also be referred to as raised bearing ridges 36, 38, as they may be raised toward the bearing as shown in FIG. 3. The raised bearing ridges 36, 38 may extend substantially perpendicular to the inside surface 30 of the centering ring 18 toward the bearing 14 (see FIGS. 1-3). The outside surface 40 of the centering ring 18 may have a central raised ridge 42 at a central region along the width W1 of the centering ring 18. The central raised ridge 42 may also be referred to as a raised housing ridge 42, as it may be raised toward the housing as shown in FIG. 3. The raised housing ridge 42 may extend substantially perpendicular to the outside surface 40 of the centering ring 18 toward the housing 16 (see FIGS. 1-3).

The raised bearing ridges 36, 38 and the raised housing ridge 42 may extend uniformly along the entire circumference of the centering ring 18. In an exemplary embodiment, this may produce a centering ring 18 that has a uniform cross section (as shown in FIG. 3) along the entire circumference of the centering ring 18.

The centering ring 18 may be formed of any material able to withstand the conditions under which it will be installed (such as pressure, temperature and the like). For example, the centering ring 18 may be made of stainless steel, such as 17-4 or 17-7 stainless steel; a nickel alloy, such as Type 718 alloy; or even a synthetic polymer, such as polypropylene. The materials may be chosen depending on the load on the shaft 12 and the desired deflection thereof.

The raised bearing ridges 36, 38 and the raised housing ridge 42 may be sized according to the specifications of the application in which the resilient mount is to be installed. For typical rotating machines 10, such as a generator, the raised bearing ridges 36, 38 and the raised housing ridge 42 may protrude from about 5 to about 50, typically from about 10 to about 30, one-thousandths of an inch from the axis formed along the width W1 of the centering ring 18. Similar to the selection of material for the centering ring, the height of the raised bearing ridges 36, 38 and the raised housing ridge 42 may be chosen depending on the load on the shaft 12 and the desired deflection thereof.

The centering ring 18 may have a diameter D that may vary depending on the side of the shaft 12 and the bearing 14. For a typical installation on a rotating machine 10, such as a generator, the centering ring 18 may have a diameter D from about 1" to about 4", typically from about 1.5" to about 2.5". The width W1 of the centering ring 18 may, as discussed above, be approximately the same as the width W2 of the bearing 14. Typically, the width W1 of the centering ring 18 may be from about ½" to about 1". Actual design configuration may depend upon characteristics of the rotor shaft system and the operating conditions and deflection involved.

Figure 5:
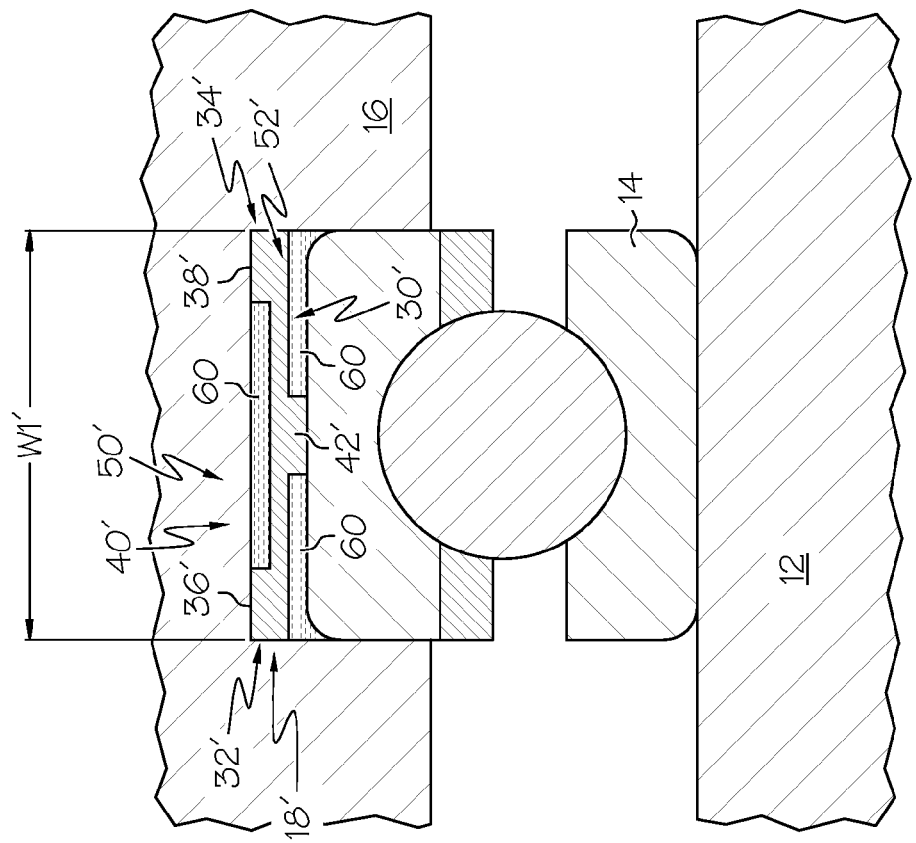
FIG. 5 is a close-up cross-sectional view showing an alternate geometry for the centering ring according to another embodiment of the present invention.

Referring now to FIG. 5, there is shown a close-up cross-sectional view showing an alternate geometry for a centering ring 18' according to another embodiment of the present invention. The configuration of the centering ring 18' according to this embodiment of the present invention can be envisioned as the centering ring 18, as previously described, turned inside out. In other words, the centering ring 18' may have a first side 32' and a second side 34' along its width W1'. The outside surface 40' of the centering ring 18' may have exterior raised ridges 36' and 38' at the first side 32' and the second side 34', respectively. Exterior raised ridges 36' and 38' may also be referred to as raised housing ridges 36', 38', as they may be raised toward the housing as shown in FIG. 5. The raised housing ridges 36', 38' may extend substantially perpendicular to the outside surface 40' of the centering ring 18' toward the housing 16. The inside surface 30' of the centering ring 18' may have a central raised ridge 42' at a central region along the width W1' of the centering ring 18'.

The central raised ridge 42' may also be referred to as raised bearing ridge 42', as it may be raised toward the bearing as shown in FIG. 5. The raised bearing ridge 42' may extend substantially perpendicular to the inside surface 30' of the centering ring 18' toward the bearing 14.

The raised housing ridges 36', 38' and the raised bearing ridge 42' may be disposed uniformly along the entire circumference of the centering ring 18'. This may result in a centering ring 18' that has a uniform cross section along the entire circumference of the centering ring 18'.

Referring back to FIG. 3, circumferential/torroidal spaces 50 may be formed between the housing 16 and the centering ring 18 because the central raised ridge 42 retains the outside surface 40 a finite distance from the surface of the housing 16. Additionally, a circumferential/torroidal space 52 may also be formed between the bearing and the centering ring 18 because of the protrusion of the exterior raised ridges 36, 38. One or more of these circumferential/torroidal spaces 50 may contain a damping substance or fluid 60 such as an oil or a polymer, to provide damping between the bearing 14 and the housing 16.

In a similar manner, referring back to FIG. 5, circumferential/torroidal spaces 50' may be formed between the bearing 14 and the centering ring 18' because of the protrusion of the central raised ridge 42'. Additionally, a circumferential/torroidal space 52' may also be formed between the housing 16 and the centering ring 18' because of the protrusion of the exterior raised ridges 36', 38'. These circumferential/torroidal spaces 50' may contain the damping fluid 60 to provide damping between the bearing 14 and the housing 16.

It should be understood, of course, that the foregoing relates to preferred embodiments of the invention and that modifications may be made without departing from the spirit and scope of the invention as set forth in the following claims.

We claim:

1. A resilient mounting system comprising:
   a bearing adapted to support a shaft;
   a housing adapted to support the bearing;
   a centering ring disposed between the housing and the bearing, the centering ring comprising:
      an inside surface adapted to fit about the bearing;
      an outside surface adapted to fit within the housing;
      a first side and a second side, the first side and the second side defining end points along a width of the centering ring;
      a first exterior raised ridge and a second exterior raised ridge disposed about a circumference on the first side and the second side of the centering ring; and
      a central raised ridge disposed about a circumference on the centering ring;
      wherein the first exterior raised ridge and the second exterior raised ridge are both on one of the inside surface or the outside surface and the central raised ridge is on the other of the inside surface or the outside surface;
   a damping fluid disposed in spaces formed between the housing and the centering ring and in spaces formed between the centering ring and the bearing; and
   wherein the damping fluid is selected from at least one of an oil and a polymer.

2. The resilient mounting system of claim 1, wherein:
   the first exterior raised ridge and the second exterior raised ridge are both disposed on the inside surface of the centering ring; and
   the central raised ridge is disposed on the outside surface of the centering ring.

3. The resilient mounting system of claim 1, wherein:
   the first exterior raised ridge and the second exterior raised ridge are both disposed on the outside surface of the centering ring; and
   the central raised ridge is disposed on the inside surface of the centering ring.

4. The resilient mounting system of claim 1, wherein the centering ring has a constant cross-sectional geometry across the entire circumference thereof.

5. A rotating machine comprising:
   a shaft;
   a bearing supporting the shaft;
   a housing supporting the bearing;
   a centering ring disposed between the housing and the bearing, the centering ring comprising:
      an inside surface disposed about the bearing;
      an outside surface disposed within the housing;
      a first side and a second side, the first side and the second side defining end points along a width of the centering ring;
      a first exterior raised ridge and a second exterior raised ridge disposed about a circumference on the first side and the second side of the centering ring; and
      a central raised ridge disposed about a circumference on the centering ring;
      wherein the first exterior raised ridge and the second exterior raised ridge are both on one of the inside surface or the outside surface and the central raised ridge is on the other of the inside surface or the outside surface; and
   a damping fluid disposed in spaces formed between the housing and the centering ring and in spaces formed between the centering ring and the bearing.

6. The rotating machine of claim 5, wherein:
   the first exterior raised ridge and the second exterior raised ridge are both disposed on the inside surface of the centering ring; and
   the central raised ridge is disposed on the outside surface of the centering ring.

7. The rotating machine of claim 5, wherein:
   the first exterior raised ridge and the second exterior raised ridge are both disposed on the outside surface of the centering ring; and
   the central raised ridge is disposed on the inside surface of the centering ring.

8. The rotating machine of claim 5, wherein the centering ring provides a constant stiffness for the shaft supported in the bearing.

9. The rotating machine of claim 5, wherein the rotating machine is a generator.

10. The rotating machine of claim 5, wherein the centering ring has a constant cross-sectional geometry across the entire circumference thereof.

* * * * *